(12) United States Patent
Kline

(10) Patent No.: US 11,356,569 B2
(45) Date of Patent: Jun. 7, 2022

(54) INTERACTIVE KIOSK SYSTEM

(71) Applicant: Alicia Kline, N. Las Vegas, NV (US)

(72) Inventor: Alicia Kline, N. Las Vegas, NV (US)

( * ) Notice: Subject to any disclaimer, the term of this patent is extended or adjusted under 35 U.S.C. 154(b) by 0 days.

(21) Appl. No.: 17/113,090

(22) Filed: Dec. 6, 2020

(65) Prior Publication Data

US 2021/0092235 A1  Mar. 25, 2021

Related U.S. Application Data

(63) Continuation of application No. 16/425,903, filed on May 29, 2019, now Pat. No. 10,893,154.

(51) Int. Cl.
*H04N 1/00* (2006.01)
*G07F 17/26* (2006.01)
*G07F 17/00* (2006.01)

(52) U.S. Cl.
CPC ....... *H04N 1/0019* (2013.01); *G07F 17/0014* (2013.01); *G07F 17/26* (2013.01); *H04N 1/00143* (2013.01); *H04N 1/00177* (2013.01)

(58) Field of Classification Search
CPC .................................................. H04N 1/0019
USPC ....................................................... 358/1.15
See application file for complete search history.

(56) References Cited

U.S. PATENT DOCUMENTS

| 5,687,087 | A | * | 11/1997 | Taggart | G07F 17/26 700/233 |
| 6,508,904 | B1 | ‡ | 1/2003 | Charley | G09F 3/02 156/24 |
| 7,370,076 | B2 | ‡ | 5/2008 | Friedman | G06Q 30/02 709/20 |
| 7,734,499 | B1 | ‡ | 6/2010 | Mudrick | G06Q 30/0241 705/7 |
| 8,626,614 | B2 | ‡ | 1/2014 | Barber | G06Q 20/204 705/28 |
| 2004/0195455 | A1 | * | 10/2004 | Maida | H04N 1/00161 244/129.1 |
| 2006/0222858 | A1 | ‡ | 10/2006 | Haas | B43L 1/123 428/413 |
| 2007/0201103 | A1 | ‡ | 8/2007 | Morgan | H04N 1/00132 358/40 |
| 2009/0266901 | A1 | ‡ | 10/2009 | Dine | G06K 19/06196 235/49 |
| 2016/0282239 | A1 | ‡ | 9/2016 | Capps | G01N 1/312 |
| 2017/0132683 | A1 | * | 5/2017 | Gunderson | G06Q 30/0641 |

* cited by examiner
‡ imported from a related application

*Primary Examiner* — Jacky X Zheng
(74) *Attorney, Agent, or Firm* — Runyan Law; Charles Runyan

(57) ABSTRACT

A kiosk system and method of producing a personalized souvenir using the personalized souvenir producing interactive kiosk system. The system includes a vending machine-like kiosk configured to communicate with a user's electronic device, such as a smartphone, to accept an upload of a user-selected digital image. The kiosk then creates a personalized souvenir in a refrigerator magnet using the digital image and printing the digital image on a section of magnetic sheeting.

14 Claims, 5 Drawing Sheets

INTERACTIVE KIOSK SYSTEM

CROSS-REFERENCE TO RELATED APPLICATION

The present application is related to, claims priority to, and incorporates by reference U.S. Non-Provisional patent application Ser. No. 16/425,903 filed May 29, 2019, allowed.

BACKGROUND

Field

The present invention generally relates to kiosks and vending machines and relates to a souvenir producing kiosk.

Description of Related Art

Often when individuals go on vacations or to a special event, they purchase souvenirs. There are many opportunities to purchase or otherwise acquire some item that commemorates or reminds them of their experience. There are many types of souvenirs on the market today. Many of these souvenirs are generic and do not 'stand out' as something special. But consumers might want a souvenir personalized, for example, their name.

US Pub. No. 2004/0195455 to Michael Maida relates to an interactive kiosk for producing postcards from digital images stored on removable digital camera memory media. The described interactive kiosk for producing postcards from digital images stored on removable digital camera memory media includes an interactive kiosk that permits the user to create custom postcards composed of photographs taken with the user's digital camera. The postcards will be printed instantly by reading the memory (via the camera's memory card or by wire transfer or infrared transfer of images) of the user's digital still or video camera. The kiosk contains a programmed computer that guides the user through the transfer and postcard creation process. The photograph/s will be printed in high-quality color or black and white on one side with various options for borders and text messages. The postcard's back would resemble a traditional postcard with space for a message to the recipient and their address.

BRIEF SUMMARY OF THE INVENTION

The present disclosure provides a novel personalized souvenir producing interactive kiosk system. This disclosure describes a kiosk configured to communicate with a user's digital device, such as a smartphone, to accept digital image data to create a custom souvenir-style magnet using the image data. The upload may take place via BLUETOOTH, wireless Internet, or a transfer cable.

A personalized souvenir kiosk system is disclosed. The kiosk system is used to create custom, on-demand, souvenir magnets using consumer transmitted photographic images. The system includes a vending machine-like kiosk having a user interface providing an interactive display, a payment system, digital input for receiving a digital image from an electronic device, a housing storing magnetic sheeting, a printer configured to print a digital image on a section of the magnetic sheeting stored in the kiosk in response to receiving the digital image and the payment from the user, and a central processing unit controlling functions of the printer, and a dispenser tray for dispensing and delivering a personalized refrigerator magnet souvenir to the user.

The kiosk includes at least one port for receiving a transfer cable to upload a digital image for use. The vending machine may include BLUETOOTH technology and wireless connectivity as additional options for connecting to a camera, a smartphone, tablet, or other electronic device.

A method of producing personalized souvenirs using a kiosk system is also disclosed. The method may comprise the steps of providing a kiosk system including a kiosk having a user interface providing a user interactive display, a payment receiving and processing system, a powering source, a digital input receiver for receiving a digital image from an electronic device, a housing storing a supply of magnetic sheeting, a printer configured to print a digital image on a section of the supply of magnetic sheeting stored in the kiosk in response to receiving the digital image and the payment from the user, and a central processing unit controlling functions of the printer; and a dispenser tray for dispensing and delivering a to the user; connecting the electronic device to the kiosk and establishing communication; selecting the digital image from the electronic device using the user interface; receiving payment via the payment receiving and processing system; printing souvenir the digital image on the section of the supply of magnetic sheeting; and dispensing the personalized souvenir. The method may further include disconnecting the electronic device from the kiosk and restocking the magnetic sheeting supply.

The invention may achieve or optimize an advantage without achieving other advantages.

BRIEF DESCRIPTION OF THE DRAWINGS

The figures that accompany the written portion of this specification illustrate exemplars and methods of an interactive kiosk system.

The present invention's exemplars will be described with the appended drawings, wherein like designations denote like elements.

DETAILED DESCRIPTION

Exemplars of the present disclosure relate to a kiosk and, more particularly, to a kiosk system to provide a new and improved kiosk that allows users to easily upload a desired digital image. The kiosk will create and dispense a custom souvenir magnet from the uploaded image.

Generally, the kiosk system provides a vending device that accepts consumer transmitted photographic images and creates customized magnets using the consumer transmitted photographic images. The kiosk includes a printer, magnetic sheeting that feeds through this printer, and substrate coating upon this magnetic sheeting, upon which the printer applies ink. An exterior accessible touchscreen is featured on the kiosk and connects by wire to a central processing unit (CPU). The kiosk further comprises a payment processer accessible from the kiosk's exterior and connected or wirelessly connected to the central processing unit (CPU). The central processing unit (CPU) includes programming that remains in a wait state until activated by a user. This programming then instructs how a user may upload an image, select the image's layout, initiate a payment, and print. After payment and design of a personalized souvenir, production may be initiated.

In particular exemplars, the kiosk may produce hard magnets. In such variations, the hard magnet's material may feature various topcoat substrates capable of adhesion on such material. The kiosk may print images on an adequate paper stock applied by adhesive to the hard magnet material in a further variation. The system may include options in which a user may select or enter text upon an uploaded digital image to be applied upon a magnet during printing. In some versions, the kiosk may feature a keyboard or touchscreen keyboard, which a user may use to enter data to be applied as text during the printing. The personalized souvenirs may be made in variations that produce business card magnets or advertising magnets, including keyboard options to allow user entry of needed data or images.

The personalized souvenirs may be made in variations that allow a final magnet image to be distributed by the user via the Internet or electronic mail. A router for distribution through an internet service provider (ISP) will be included in such variations. The kiosk system may feature a built-in camera to take a user photo for printing on a magnet in yet another embodiment.

Figure 1:
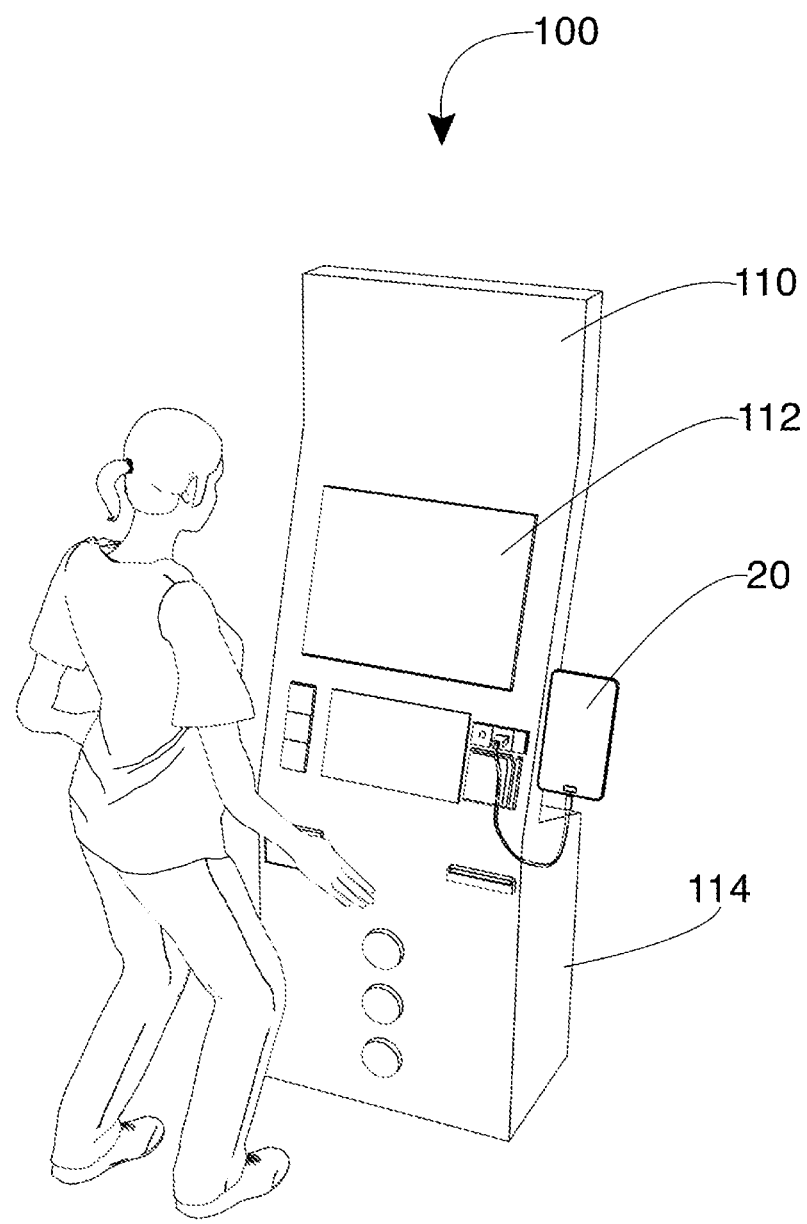
FIG. 1 is a perspective view of the kiosk system during an 'in-use' condition.

FIGS. 1-4 show various views of a personalized interactive souvenir kiosk system 100. FIG. 1 shows a kiosk system 100. As illustrated, the kiosk system 100 may include a kiosk 110 for producing a souvenir 10. The kiosk 110 includes a user interface 112, a payment receiving and processing system 116, a powering source 120 such as a power cord for powering the kiosk 110, a digital input receiver for receiving a digital image from an electronic device 20, a housing 114 storing a supply of magnetic sheeting 122, a printer 126 configured to print a user-selected digital image on a section of the supply of magnetic sheeting 122 stored in the kiosk 110 in response to receiving the digital image and payment from the user, and a central processing unit 128 controlling functions of the printer 126, and a dispenser tray 130 for dispensing and delivering the souvenir 10, specifically, a refrigerator magnet, to the user. Another such souvenir 10 may be produced in alternate exemplars. The kiosk 110 may be placed in many environments to high foot traffic destinations such as tourist destinations, amusement parks, national parks, hotels, and casinos.

The user interface 112 provides an interactive display. In a preferred embodiment, the user interface 112 comprises a touchscreen digital display allowing the user to input information, make selections, and customize an order for the souvenir 10. The interactive display displays a process sequence for guiding a user through creating the refrigerator magnet. The payment receiving and processing system 116 is provided for accepting and processing payment from a user. The kiosk 110 communicates with the electronic device 20 such that it can receive a digital image from the electronic device 20.

Figure 2:
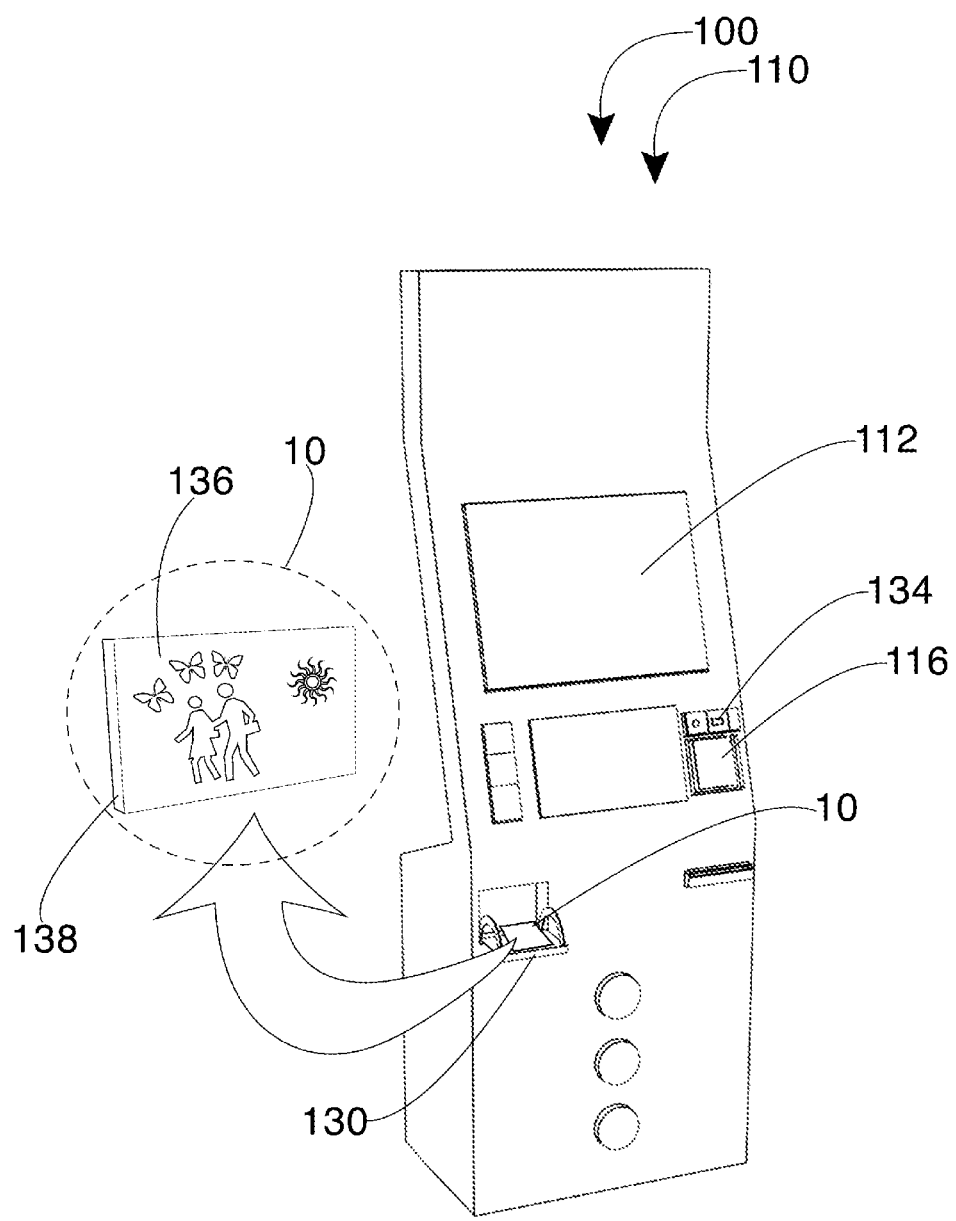
FIG. 2 is a front perspective view of the system of FIG. 1.

FIG. 2 shows a perspective view of the kiosk system 100 of FIG. 1, according to the present disclosure's embodiment. As above, the kiosk system 100 may include the kiosk 110 comprising the user interface 112, payment receiving and processing system 116, powering source 120, digital input receiver, dispenser tray 130, and housing 114 for the supply of magnetic sheeting 122, printer 126, and central processing unit 128. The payment receiving and processing system 116 is accessible from the kiosk exterior. It includes a paper currency acceptor 117 for receiving and processing paper money payments and paper currency storage bin 118 for storage thereof. The payment receiving and processing system 116 further comprises a mag stripe reader 132 for reading and processing payment from a payment card such as a credit card or debit card. In other exemplars, the kiosk 110 is configured to accept other formats of electronic transactions, such as but not limited to PAYPAL, cryptocurrency, APPLE PAY, and other payment methods.

Figure 3:
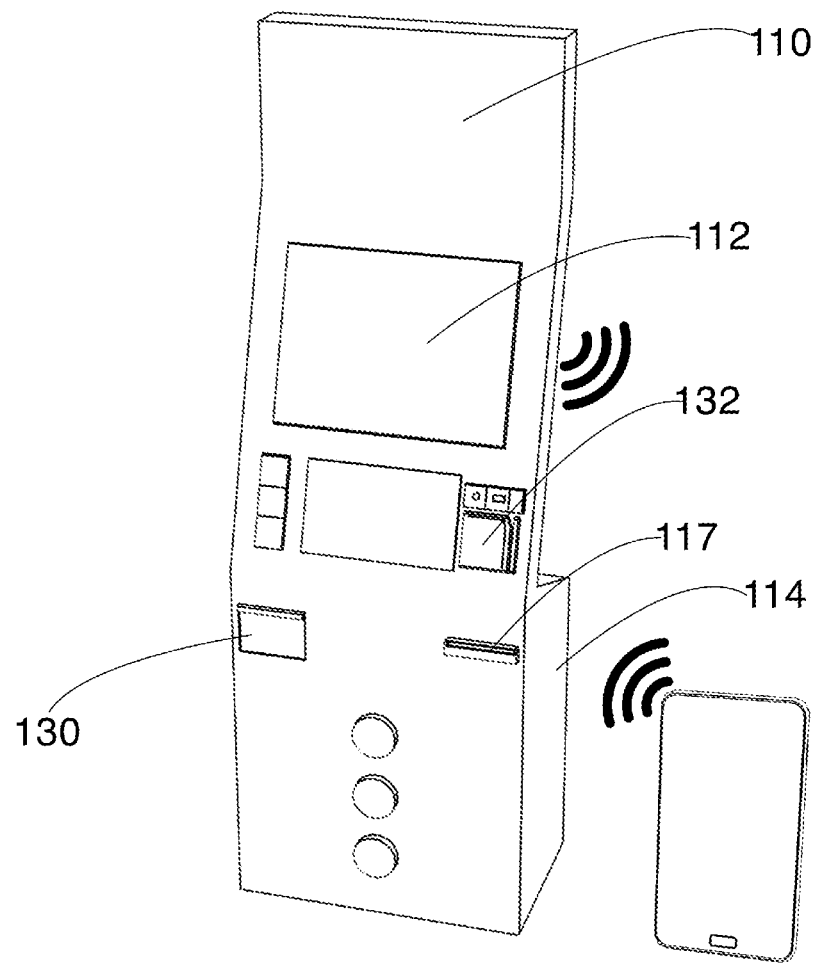
FIG. 3 is another front perspective view of the system of FIG. 1.

FIG. 3 shows a perspective view of the kiosk system 100 of FIG. 1, according to the present disclosure's embodiment. As above, the kiosk system 100 may include the kiosk 110 for designing and printing custom refrigerator magnets using a user-selected digital image. In a preferred embodiment, the kiosk 110 includes at least one port 134, such as a Universal Serial Bus port configured to receive a transfer cable and connect with an electronic device 20 for receiving the user-selected digital image from the electronic device 20. The user-selected digital image is then transferred from the electronic device 20 to the central processing unit 128. The central processing unit 128 controls the printer and feeds the supply of magnetic sheeting 122 within the kiosk 110. The kiosk 110 further comprises wireless communication capability and BLUETOOTH technology for communicating with a remote electronic device 20 and transmitting the digital image to the central processing unit 128. Other suitable methods of uploading files from an electronic device 20 for printing may be used.

Figure 4:
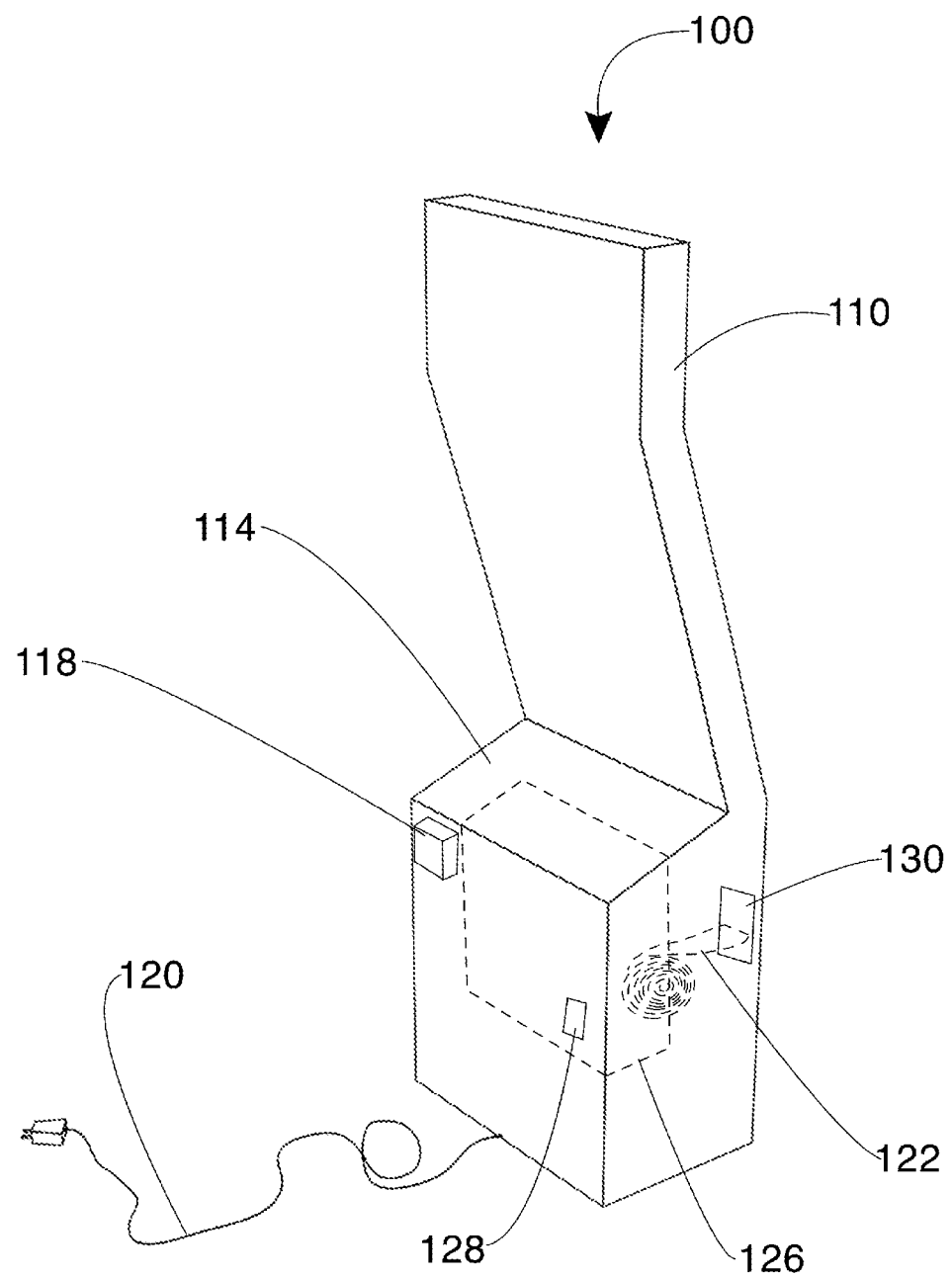
FIG. 4 is a rear perspective view of the kiosk system of FIG. 1.

FIG. 4 shows a perspective view of the kiosk system 100 of FIG. 1, according to the present disclosure's embodiment. The kiosk system 100 may include a kiosk 110 configured to print various customizable designs to create a refrigerator magnet. In a preferred embodiment, internal metal components of the printer 126 and the kiosk 110 are coated with a nonstick material for aiding in effective dispensing of the souvenir 10. The nonstick material may include paperboard coating, particle board coating, STYROFOAM, or the like to avoid interruption and interference in the flow of magnetic material during printing. A nonmetallic roller tray is also utilized. The nonmagnetic roller tray accepts a finished individual unit of magnetic sheeting 122 and feeds the finished refrigerator magnet through a durable chute. This chute, dispenser tray 130, extends beyond the housing 114 for external distribution to the user.

As above, the kiosk system 100 may include a supply of magnetic sheeting 122 housed within the kiosk 110. In particular exemplars, the supply of magnetic sheeting 122 may be pre-cut into individual refrigerator magnets for printing the user-selected digital image thereon. The refrigerator magnets may be pre-cut in various sizes and shapes. In a preferred embodiment, quantities of these pre-cut magnet units are retained within a vertical chute and on a spring-loaded platform made of polyvinyl chloride (PVC), which feeds them into a printer. In other exemplars, the kiosk system 100 includes a cutting press for separating the supply of magnetic sheeting 122 into individual refrigerator magnet size sections of various sizes, shapes, and patterns for printing the user-selected digital image thereon.

Printing and dispensing occur upon completion of the payment; system 100 will release the spring-loaded platform that hosts magnetic sheeting segments until one of the magnetic sheeting segments enters the printer. The printer will then print on that magnetic sheeting segment. Upon completing the printing, that magnetic sheeting segment will be released upon the roller tray and ejected through the dispenser tray 130.

Besides using user-selected digital images, the kiosk 110 may further comprise a database configured to store preprogrammed templates, preprogrammed images, preprogrammed backgrounds, borders, or other image add-ons for further customization of the personalized souvenir. The digital images may include a photograph, a graphic image, or preprogrammed images to be used alone or in combination. The user may edit, adjust, crop, expand, reduce, or otherwise manipulate at least one of the digital images using the user interface. The system 100 may include photo enhancing programs for use by the user, such as grayscale, blue wash, and other image enhancement options.

The digital image is printed on a top surface 136 of the refrigerator magnet opposing a magnetic base 138. The top surface 136 may comprise a material such as but not limited to a vinyl substrate, polyethylene (PET), and polyvinyl chloride (PVC) for ink, solvent, eco-solvent, latex, and ultraviolet (UV) ink to be printed thereon. The kiosk system 100 may include a finish coating option to be applied to a printed refrigerator magnet, and the coating may be of gloss or matte varieties. The kiosk 110 may further include an internal air blower positioned to aerate the souvenir 10 after individual production and to ensure the ink has dried before dispensing the finished product to the user.

Figure 5:
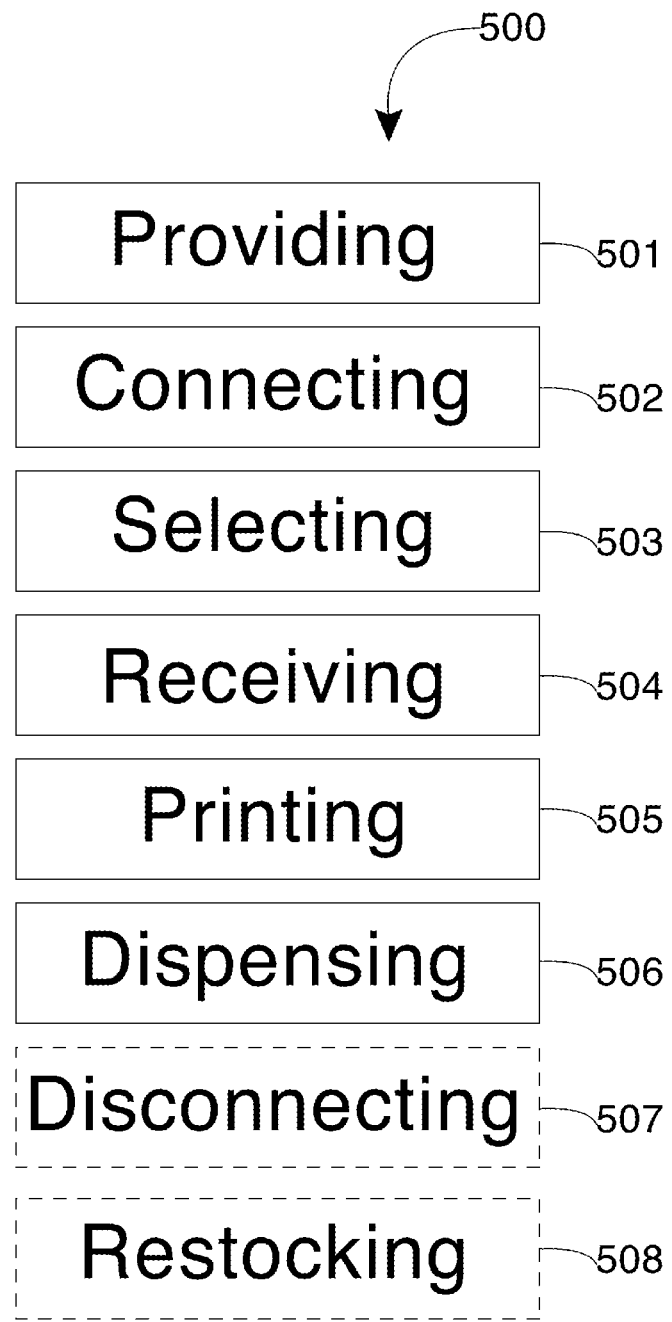
FIG. 5 is a flow diagram illustrating a method of use of an interactive kiosk system.

FIG. 5 is a flow diagram 550 illustrating a method of producing personalized souvenirs using a kiosk system 500, according to the present disclosure's embodiment. As illustrated, the method of producing souvenir using a kiosk system 500 may include step one 501, providing a kiosk system 100 including a kiosk 110 having a user interface 112 providing a user interactive display, a payment receiving and processing system 116, a powering source 120, a digital input receiver for receiving a digital image from an electronic device 20, a housing 114 storing a supply of magnetic sheeting 122, a printer 126 configured to print a user selected the digital image on a section of the supply of magnetic sheeting 122 stored in the kiosk 110 in response to receiving the digital image and the payment from the user, and a central processing unit 128 controlling functions of the printer 126; and a dispenser tray 130 for dispensing and delivering a souvenir 10 to the user; step two 502, connecting the electronic device 20 to the kiosk 110 and establishing communication therebetween; step three 503, selecting the digital image from the electronic device 20 using the user interface 112; step four 504, receiving payment via the payment receiving and processing system 116; step five 505, printing souvenir the digital image on the section of the supply of magnetic sheeting 122; step six 506, dispensing the souvenir 10; step seven 507, disconnecting the electronic device 20 from the kiosk 110; and step eight 508, restocking the supply of magnetic sheeting 122 as needed.

Step seven 507 and step eight 508 are optional steps and may not always be implemented. Optional steps of the method of use 500 are illustrated using dotted lines in FIG. 5 to distinguish them from the other steps of the method of use 500. The steps also described in the method of use can be carried out in many orders according to user preference.

Considering such issues as design preference, user preferences, marketing preferences, cost, structural requirements, available materials, technological advances, etc., other methods for producing personalized souvenirs using a kiosk system 100 are also taught.

The exemplars of the invention described are exemplary. Numerous modifications, variations, and rearrangements can be readily envisioned to achieve substantially equivalent results, which are intended to be embraced within the invention's spirit and scope.

What is claimed is:

1. A system comprising a kiosk having a user interface with a display;
   a user payment system;
   a digital input port or antenna;
   a housing storing
      magnetic sheeting having dimensions of 1 inch by 1 inch to 12 inches by 12 inches;
      a printer adapted to print on magnetic sheeting; and
      a processing unit (CPU) connected to the printer and the digital input port or antenna;
   and
   a souvenir dispenser.

2. The system of claim 1, wherein the CPU has memory containing software instructions that cause the CPU to receive image data from the input port and that instruct the printer to print the image onto a piece of the magnetic sheeting.

3. The system of claim 2 wherein the payment system is configured to receive payment and send signals to the CPU indicating payment and the CPU has memory containing software to receive signals from the payment system.

4. The system of claim 3, wherein the port is a Universal Serial Bus port.

5. The system of claim 4, wherein the CPU has memory containing software instructions that cause the CPU to receive image data through the input antenna and that instruct the printer to print the image on a piece of the magnetic sheeting.

6. The system of claim 5, further comprises a cutting press having a magnetic sheet cutting capacity of 1 inch by 1 inch to 12 inches by 12 inches.

7. The system of claim 6, wherein the CPU connects to a database containing templates, images, or backgrounds and contains software to cause the printer to print the image data, images, templates, or backgrounds onto a piece of the magnetic sheeting.

8. The system of claim 2, wherein the CPU has memory containing software instructions that cause the CPU to receive image data through the input antenna and that instruct the printer to print the image on a piece of the magnetic sheeting.

9. The system of claim 8, wherein the dimensions of the magnetic sheeting 1 inch by 1 inch to 12 inches by 12 inches.

10. The system of claim 8, further comprises a cutting press having a magnetic sheet cutting capacity of 1 inch by 1 inch to 12 inches by 12 inches.

11. The system of claim 10, wherein the CPU connects to a database containing templates, images, or backgrounds and contains software to cause the printer to print the image data, images, templates, or backgrounds onto a piece of the magnetic sheeting.

12. A system comprising a kiosk having
    a user interface with a display;
    a user payment system;
    a universal serial bus or antenna;
    a housing storing
       magnetic sheeting;
       a printer adapted to print on magnetic sheeting; and
       a processing unit (CPU) connected to the printer and the digital input port or antenna;
    and
    a souvenir dispenser,
    wherein the CPU has memory containing software instructions that cause the CPU to receive image data from the input port or the input antenna and that instruct the printer to print the image onto a piece of the magnetic sheeting, the payment system is configured to receive payment and send signals to the CPU indicating payment and the CPU has memory containing software to receive signals from the payment system, the dimensions of the magnetic sheeting are 1 inch by 1 inch to 12 inches by 12 inches or the system further comprises a cutting press having a magnetic sheet cutting capacity of 1 inch by 1 inch to 12 inches by 12 inches, and the CPU connects to a database containing templates, images, or backgrounds and contains software to cause the printer to print the image data, images, templates, or backgrounds onto a piece of the magnetic sheeting.

13. A method comprising the steps of:
providing a system including
  a kiosk having
    a user interface with a display;
    a user payment system;
    a digital input port or antenna;
    a housing storing
      magnetic sheeting;
      a printer adapted to print on magnetic sheeting; and
      a processing unit (CPU) connected to the printer and the digital input port or antenna;
    and
    a souvenir dispenser;
connecting the electronic device to the kiosk;
establishing communication between the electronic device and the kiosk;
selecting the digital image from the electronic device using the user interface;
receiving payment via the payment system;
printing the digital image on a section of magnetic sheeting measuring from 1 by 1 inch to 12 by 12 inches; and
dispensing the souvenir.

14. The method of claim 13, further comprising the step of disconnecting the electronic device from the kiosk.

\* \* \* \* \*